March 26, 1963

M. CAMRAS 3,083,268

INTERCHANGEABLE MAGNETIC RECORD TAPE AND METHOD OF MAKING SAME

Filed May 11, 1954

Inventors
Marvin Camras by Hill, Sherman, Meroni, Gross & Simpson Attys

United States Patent Office 3,083,268
Patented Mar. 26, 1963

3,083,268

INTERCHANGEABLE MAGNETIC RECORD TAPE AND METHOD OF MAKING SAME

Marvin Camras, Chicago, Ill., assignor to Armour Research Foundation of Illinois Institute of Technology, Chicago, Ill., a corporation of Illinois Filed May 11, 1954, Ser. No. 428,961
6 Claims. (Cl. 179—100.2)

This invention relates to a method of making a high coercive force magnetic tape record member which is interchangeable with an existing lower coercive force magnetic tape record member with respect to a given magnetic recording machine having a given fixed high frequency bias, and to a high coercive force magnetic tape record member manufactured in accordance with said method.

It is an object of the present invention to provide a novel method of making a high coercive force magnetic tape record member which is interchangeable with an existing tape for a given magnetic recording machine.

It is a further object of the present invention to provide a magnetic tape record member bearing a novel relationship to an existing magnetic tape record member with respect to a given magnetic recording machine having a given fixed high frequency bias.

Other objects, features and advantages of the present invention will become apparent from the following detailed description taken in conjunction with the accompanying drawings, in which.

As shown on the drawings.

The present invention has for its object the provision of a substitute tape which will give substantially the same performance as an existing standard tape on a given type magnetic recorder with a given high frequency bias, the substitute tape for example having a higher coercive force than the standard tape.

Prior to this invention, magnetic recorders were designed for optimum performance with a specific kind of tape. Any other tape required either a change in bias, or a compromise setting where best performance was sacrificed. For example, when a tape of higher coercive force was used without increased bias, the result was poor low frequency response, harmonic and intermodulation distortion especially of the low frequencies, and decreased sensitivity. Such recordings had a tendency toward harshness and raspiness that became irritating upon prolonged listening.

Adjustment of bias has not been provided in general purpose recorders or even in most professional recorders, because proper adjustment requires instruments and training not possessed by the ordinary operator.

Figure 1:
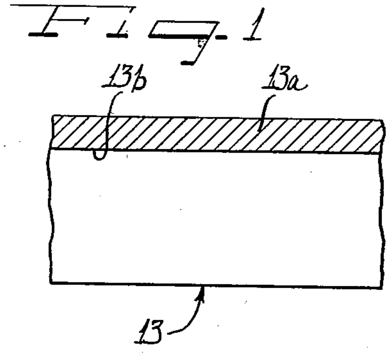
FIGURE 1 is a diagrammatic view representing an existing standard tape for use with a magnetic recorder machine having a given fixed high frequency bias.
Figure 2:
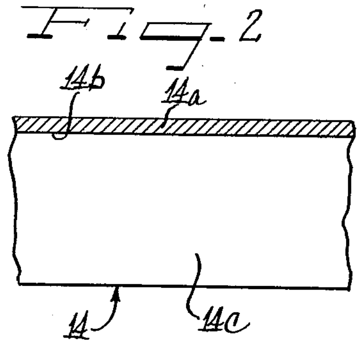
FIGURE 2 is a diagrammatic representation of a tape manufactured in accordance with the present invention which is interchangeable with the tape of FIGURE 1 with respect to said magnetic recording machine having the fixed high frequency bias.
Figure 3:
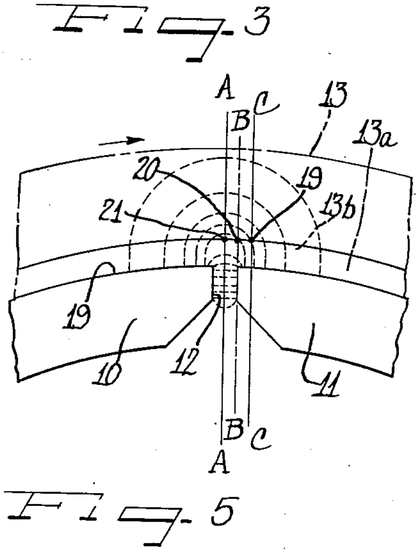
FIGURE 3 is a diagrammatic illustration of the field at the gap of a typical recording head.
Figure 4:
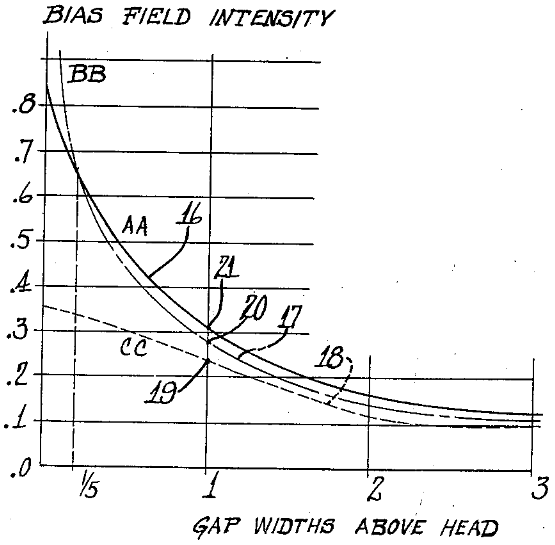
FIGURE 4 is a graph representing the total field intensity at different points above the head of FIGURE 3 as measured along lines at right angles to the gap and at successive positions with respect to the gap.

By way of example, if FIGURES 3 and 4 are taken to represent the operating conditions for a given existing tape recording machine having recording poles 10 and

11 defining a non-magnetic gap 12, the machine having been designed for an existing tape 13 and the bias voltage of the machine having been established to give optimum performance with the tape 13, the present invention then contemplates the manufacture of a tape 14 which will give optimum performance with no change in the bias of the existing machine.

For example, the existing tape 13 may have a coating thickness indicated at 13a of .65 mil (1 mil equals 0.001 inch), the coating material having a coercive force of 240 oersteds. It is then desired to determine an interchangeable tape 14 which may be used with optimum results on the same fixed bias machine.

It has been discovered that such a tape can be manufactured by applying to the tape base a coating 14a of thickness to have a bias field intensity in the part of the magnetizable coating farthest from the recording gap substantially equal to the ratio of the coercive force of the magnetizable layer 14a, to the coercive force of the magnetizable layer 13a, the ratio being multiplied by the bias field intensity in the corresponding part of the existing tape 13.

In one embodiment of the method, the value of bias field intensity in the part 13b of the coating 13a is taken as the bias field intensity in air at a distance above the poles 10 and 11 equal to the coating thickness. The curve 16 in FIGURE 4 represents the field intensity as a function of the distance above the poles 10 and 11 along the line AA, the distance above the poles being measured in terms of the width of the gap 12. The curve 17 represents a plot of field intensity along the line BB in terms of gap widths above the poles 10 and 11; and the curve 18 represents a similar plot along the line CC in FIGURE 3. It will thus be observed from FIGURE 4, that for points in the magnetizable layer 13a that are closer than about one-fifth of a gap width from the surface of the head, the maximum field intensity is encountered near the gap edge provided by the pole 11 (the trailing pole) along the line BB. For points further above the head surface than about one-fifth gap width, the maximum field intensity is encountered near the gap center (along the line AA). The higher of the two curves 16 and 17 at any given distance above the head surface is taken as the maximum field intensity at that distance above the head surface.

Thus, for example, if it desired to find the maximum field intensity in the outer part of a magnetizable layer of a tape, the coating having a thickness equal to the width of the recording head gap with which the tape is used, the point 19 represents the maximum field intensity along the line CC, the point 20 represents the maximum field intensity along the line BB, and the point 21 represents the maximum field intensity along the line AA. In this case, the maximum field intensity for a coating thickness of one gap width would be taken at approximately .31 on a relative basis corresponding to the point 21. For purposes of this invention any arbitrary units of field strength may be used; actually the values on the graph of FIGURE 4 are relative to the uniform field deep inside the gap 12.

While the values of flux density derived from FIGURE 4 are those existing in air, and the permeability of a tape layer is greater than that for air, the relative values of field intensity in the magnetizable layer will closely approximate those derived by the use of FIGURE 4.

As a practical illustration, suppose that a tape having a gamma $Fe_2O_3$ layer 0.65 mil thick with a coercive force of 240 oersteds is used with a standard tape recorder machine having a fixed high frequency bias. This conforms closely to present day practice, and a coating material of these properties may be prepared as outlined in my application Serial No. 763,486, now U.S. Patent No. 2,694,656 issued Nov. 16, 1954. Taking the recording gap 12 in FIGURE 3 as having a width of 0.25 mil, a portion of the layer 13*a* farthest from the head is 2.6 gap widths away, so that referring to FIGURE 4, it encounters a maximum field of 0.13 unit. If it is desired to make an interchangeable tape such as 14 with a layer 14*a* of the same chemical composition, but having a coercive force of 330 oersteds, the tape base 14*c* is coated with a coating having a coercive force of 330 oersteds and a thickness to have a bias flux density in the outer part of the magnetizable coating at 14*b* substantially equal to the ratio of 330 oersteds to the coercive force of the existing tape, namely 240 oersteds, the ratio being multiplied by the value of the given maximum bias field intensity namely .13 unit, which gives a value of .18 unit of field intensity at the layer 14*b* of the magnetizable coating 14*a*. Referring to FIGURE 4, it will be observed that this maximum field intensity of .18 is obtained with a coating thickness of 1.7 gap widths or a thickness of 0.425 mil.

It has been found that when the maximum field intensities in air for a given head at the outer part of the magnetizable layer are proportioned in this manner, that the substitute tape functions in an optimum manner with the given head and high frequency bias.

To illustrate that for typical gaps and coatings in commercial use, the substitute tape will have a thickness which is fairly independent of gap size, the following example may be considered.

If the gap width had been 0.5 mil instead of 0.25 mil, then, in the above example, the relative field intensity would be 0.25 unit. The desired relative field strength in the outer part of the magnetizable layer at 14*b* would then be 0.34 unit which occurs at approximately 0.8 gap widths above the head or 0.40 mil which is quite close to the 0.425 mil tape thickness obtained for gap width of 0.25 mil.

It may be noted that "effective" gap width tends to be somewhat larger than the physical gap width, especially for very short gaps; so that for example a "one-fourth mil" gap may actually behave as if it were a 0.3 mil or larger gap with the above tapes. The one half mil gap generally shows a less-than proportionally larger effective gap.

Figure 5:
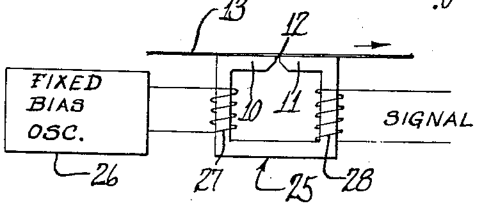
FIGURE 5 is a diagrammatic illustration of a recording machine having fixed bias to which the principles of the present invention may apply.

FIGURE 5 illustrates diagrammatically a tape recording machine having a core 25 providing the poles 10 and 11, and having an oscillator 26 with a relatively fixed output the bias flux from winding 27 being superimposed on a signal flux introduced by a winding 28. The tape 14 will give optimum results when used with the same fixed oscillator output as was determined to be optimum for the tape 13.

While I have described a preferred embodiment of my invention, it will be apparent that many modifications and variations may be made without departing from the scope of the novel concepts thereof.

I claim as my invention:

1. In combination with a magnetic recording machine comprising a ring-type head having a longitudinal gap and a high frequency bias supply set to supply an optimum amplitude of bias current to the head to provide an optimum amplitude of bias field intensity for a conventional magnetic record tape with a magnetizable layer of thickness $t_1$ equal to about .65 mil and of coercive force $H_{C_1}$ equal to about 240 oersteds, said head when energized by said optimum amplitude of bias current providing a maximum amplitude of bias field intensity $H_{B_1}$ in air above said head a distance of $t_1$ and providing a maximum amplitude of bias field intensity $H_{B_2}$ in air above said head a distance $t_2$ substantially less than .65 mil, the improvement comprising an interchangeable magnetic record tape for substitution for said conventional magnetic record tape in said magnetic recording machine, said interchangeable magnetic tape having a non-magnetic base and a single layer of magnetizable material thereon, said layer having a substantially uniform coercive force $H_{C_2}$ throughout its volume and having a total thickness $t_2$ such that $$\frac{H_{C_2}}{H_{B_2}}=\frac{H_{C_1}}{H_{B_1}}$$

the coercive force $H_{C_2}$ being of the order of 330 oersteds and the thickness of the magnetizable layer $t_2$ being of the order of 0.4 mil.

2. As an article of manufacture, an interchangeable magnetic record tape for substitution for a conventional magnetic record tape which has a magnetizable layer of thickness $t_1$ equal to about .65 mil and a coercive force $H_{C_1}$ equal to about 240 oersteds in a magnetic recording machine which comprises a ring-type head having a longitudinal gap and a high frequency bias supply set to supply an optimum amplitude of bias current to the head to provide an optimum amplitude of bias field intensity for said conventional magnetic record tape, the head when energized by said optimum amplitude of bias current providing a maximum amplitude of bias field intensity $H_{B_1}$ in air above said head a distance $t_1$ and providing a maximum amplitude of bias field intensity $H_{B_2}$ in air above said head a distance $t_2$ substantially less than .65 mil, said interchangeable tape comprising a non-magnetic base and a single layer of magnetizable material thereon having a substantially uniform coercive force $H_{C_2}$ throughout its volume and having a total thickness $t_2$ such that $$\frac{H_{C_2}}{H_{B_2}}=\frac{H_{C_1}}{H_{B_1}}$$

the coercive force $H_{C_2}$ being of the order of 330 oersteds and the thickness of the magnetizable layer being of the order of 0.4 mil.

3. In combination with a magnetic recording machine comprising a ring-type head having a longitudinal gap and a high frequency bias supply set to supply an optimum amplitude of bias current to the head to provide an optimum amplitude of bias field intensity for a conventional magnetic record tape with a magnetizable layer of thickness $t_1$ equal to about .65 mil and of coercive force $H_{C_1}$ equal to about 240 oersteds, said head when energized by said optimum amplitude of bias current providing a maximum amplitude of bias field intensity $H_{B_1}$ in air above said head a distance of $t_1$ and providing a maximum amplitude of bias field intensity $H_{B_2}$ in air above said head a distance $t_2$ substantially less than .65 mil, the improvement comprising an interchangeable magnetic record tape for substitution for said conventional magnetic record tape in said magnetic recording machine, said interchangeable magnetic tape having a non-magnetic base and a single layer of magnetizable material thereon, said layer having a substantially uniform coercive force $H_{C_2}$ throughout its volume and having a total thickness $t_2$ such that $$\frac{H_{C_2}}{H_{B_2}}=\frac{H_{C_1}}{H_{B_1}}$$

the coercive force $H_{C_2}$ being at least about 330 oersteds and the thickness of the magnetizable layer $t_2$ being not greater than about 0.4 mil.

4. As an article of manufacture, an interchangeable magnetic record tape for substitution for a conventional magnetic record tape which has a magnetizable layer of thickness $t_1$ equal to about .65 mil and a coercive force $H_{C_1}$ equal to about 240 oersteds in a magnetic recording machine which comprises a ring-type head having a longitudinal gap and a high frequency bias supply set to supply an optimum amplitude of bias current to the head to provide an optimum amplitude of bias field intensity for said conventional magnetic record tape, the head when energized by said optimum amplitude of bias current providing a maximum amplitude of bias field intensity $H_{B_1}$ in air above said head a distance $t_1$ and providing a maximum amplitude of bias field intensity $H_{B_2}$ in air above said head a distance $t_2$ substantially less than .65 mil, said interchangeable tape comprising a non-magnetic base and a single layer of magnetizable material thereon having a substantially uniform coercive force $H_{C_2}$ throughout its volume and having a total thickness $t_2$ such that $$\frac{H_{C_2}}{H_{B_2}}=\frac{H_{C_1}}{H_{B_1}}$$

the coercive force $H_{C_2}$ being at least about 330 oersteds and the thickness of the magnetizable layer being not greater than about 0.4 mil.

5. In the magnetic recording art wherein a magnetic recording machine comprising a ring-type head having a longitudinal gap has a non-adjustable high frequency bias supply set to supply an optimum amplitude of bias current to the head to provide an optimum amplitude of bias field intensity for a conventional magnetic record tape with a magnetizable layer of thickness $t_1$ equal to about .65 mil and of coercive force $H_{C1}$ equal to about 240 oersteds, said head when energized by said optimum amplitude of bias current providing a maximum amplitude of bias field intensity $H_{B_1}$ in air above said head a distance of $t_1$ and providing a maximum amplitude of bias field intensity $H_{B_2}$ in air above said head a distance $t_2$ substantially less than .65 mil, the improvement comprising supplying an interchangeable magnetic record tape as a substitute for said conventional magnetic record tape in said magnetic recording machine, said interchangeable magnetic tape having a non-magnetic base and a single layer of magnetizable material thereon, said layer having a substantially uniform coercive force $H_{C_2}$ throughout its volume and having a total thickness $t_2$ such that $$\frac{H_{C_2}}{H_{B_2}}=\frac{H_{C_1}}{H_{B_1}}$$

the coercive force $H_{C_2}$ being of the order of 330 oersteds and the thickness of the magnetizable layer $t_2$ being of the order of 0.4 mil.

6. In the magnetic recording art wherein a magnetic recording machine comprising a ring-type head having a longitudinal gap has a non-adjustable high frequency bias supply set to supply an optimum amplitude of bias current to the head to provide an optimum amplitude of bias field intensity for a conventional magnetic record tape with a magnetizable layer of thickness $t_1$ equal to about .65 mil and of coercive force $H_{C_1}$ equal to about 240 oersteds, said head when energized by said optimum amplitude of bias current providing a maximum amplitude of bias field intensity $H_{B_1}$ in air above said head a distance of $t_1$ and providing a maximum amplitude of bias field intensity $H_{B_2}$ in air above said head a distance $t_2$ substantially less than .65 mil, the improvement comprising supplying an interchangeable magnetic record tape as a substitute for said conventional magnetic record tape in said magnetic recording machine, said interchangeable magnetic tape having a non-magnetic base and a single layer of magnetizable material thereon, said layer having a substantially uniform coercive force $H_{C_2}$ throughout its volume and having a total thickness $t_2$ such that $$\frac{H_{C_2}}{H_{B_2}}=\frac{H_{C_1}}{H_{B_1}}$$

the coercive force $H_{C_2}$ being at least about 330 oersteds and the thickness of the magnetizable layer being not greater than about 0.4 mil, and subjecting said interchangeable magnetic record tape to said optimum amplitude of bias field intensity during recording of a sound signal on said interchangeable tape.

References Cited in the file of this patent

UNITED STATES PATENTS

| | | |
|---|---|---|
| 2,443,756 | Williams | June 22, 1948 |
| 2,643,130 | Kornei | June 23, 1953 |
| 2,647,954 | Howell | Aug. 4, 1953 |